Oct. 15, 1963 P. N. WOLFE ETAL 3,107,315

SOLID STATE DISPLAY SCREENS

Filed March 25, 1958 3 Sheets-Sheet 1

WITNESSES

John E. Healy, Jr.

James F. Young

INVENTORS
Peter N. Wolfe &
Edgar A. Sack Jr.
BY
Charles F. Renz
ATTORNEY

United States Patent Office 3,107,315
Patented Oct. 15, 1963

3,107,315
SOLID STATE DISPLAY SCREENS

Peter N. Wolfe and Edgar A. Sack, Jr., Penn Hills, Pa., assignors to Westinghouse Electric Corporation, East Pittsburgh, Pa., a corporation of Pennsylvania
Filed Mar. 25, 1958, Ser. No. 723,680
8 Claims. (Cl. 315—169)

The invention relates generally to display screens, and more particularly to solid state display screens.

In the prior art, some attention has been given to building solid state display screens utilizing electroluminescent capacitors whose alternating current voltage is controlled by a direct current bias applied to associated ferroelectric capacitors. These display screens have certain advantages over conventional display devices in that they give high brightness and an adequate storage of displayed information. However, they have one disadvantage which is the complex nature of the structure. In building these structures, it is necessary to provide one or more electrodes on each of the electroluminescent cells and ferroelectric capacitors and also common electrodes. This results in a rather complex structure.

The object of the present invention is to provide for so intimately associating nonlinear dielectric or ferroelectric and electroluminescent materials in a composite solid state display screen that the ferroelectric materials due to etheir nonlinear characteristics cooperate with the electroluminescent materials to store charges in the screen and control the brightness of the electroluminescent materials, whereby the displayed radiation image is formed in accordance with the applied control charge and the distribution of the control charge on the screen.

It is also an object of the invention to provide for limiting to localized areas control charges delivered to a composite solid state display screen having intimately associated electroluminescent and nonlinear dielectric materials to produce an image having high resolution and contrast.

A further object of the invention is to provide for so associating the electroluminescent and nonlinear dielectric materials that an electrode structure on the two outer surfaces of the screen is adequate.

Other objects of the invention will, in part, be obvious, and will, in part, appear hereinafter.

The invention, accordingly, comprises the features of construction, combination of elements and arrangement of parts, which will be exemplified in the construction hereinafter set forth, and the scope of the application of which will be indicated in the claims.

For a fuller understanding of the nature and objects of the invention, reference should be had to the following detailed description taken in connection with the accompanying drawings, in which.

In the present invention, the control charge is applied in a predetermined pattern to the solid state display screen or electrode structure carried by it to produce a radiation image. The brightness of the various screen elements or sections is set by the control charge which, because it remains stored in the screen, maintains the brightness for a desired length of time. Screens embodying the features of the invention which enable the performance of the foregoing functions will now be described in detail.

Figure 1:
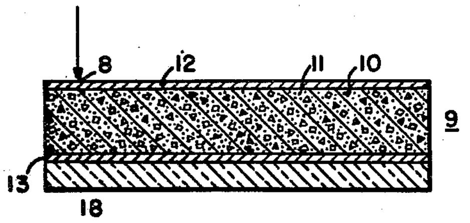
FIGURE 1 is a view in elevation of a solid state screen without any of the electrical connections.

Referring now to the drawing and FIG. 1 in particular, the solid state screen shown generally at 9 comprises electroluminescent material 10 intimately mixed with ferroelectric or nonlinear dielectric material 11 having the required nonlinear characteristics. In making this composite layer or mass of dielectric material, the electroluminescent and ferroelectric materials will both be prepared in powdered form and intimately mixed.

In some instance it may be advantageous to mix a binder such as a resin with the materials 10 and 11. The binder will serve to bond the intermixed materials when they are subjected to the necessary treatment or processing steps to give them a fixed shape. After the materials 10 and 11 have been formed into a layer or other shape the binder may be burned out of the mass of materials, or, if properly selected, it may be retained as part of the composite mass. When the binder is to be retained in the mass of electroluminescent and nonlinear dielectric materials the one selected will have such specific electrical characteristics as conductivity and permittivity which renders it compatible with the associated materials and will not in any way affect their cooperative functioning in storing charges.

The drawing indicates that the layer or mass of dielectric material comprising intimately mixed electroluminescent and nonlinear dielectric materials is of considerable thickness. However, this is merely for purposes of illustration. Actually, the mass of dielectric material will be quite thin, something of the order of one-sixteenth of an inch. The reason for employing a layer of this thickness will appear as the description proceeds.

In preparing the composite layer or mixture of nonlinear dielectric and electroluminescent materials, a number of materials have been tried. Ferroelectric or nonlinear dielectric materials that have been found to be satisfactory are triglycine sulfate, guanidine aluminum sulfate hexahydrate and barium-strontium titanate. The first two of these nonlinear dielectric materials have dielectric constants of the same order as the electroluminescent materials to be referred to hereinafter. There are many electroluminescent materials or phosphors available. Zinc sulfide or selenide activated by copper or manganese with a chlorine coactivator are quite satisfactory. These types of materials are marketed by various manufacturers with varying formulations, according to the character of the light produced by the phosphor and the nature of the required excitation.

The electroluminescent and nonlinear dielectric materials are intimately associated in a layer and may be prepared in particle form and intimately mixed in any well known manner. The fineness to which the particle or powdered materials are ground may be varied over a fairly wide range. After the electroluminescent and nonlinear dielectric or ferroelectric materials have been intimately mixed, they will be bonded with a suitable binder. Polyvinylchloride, polymethylmethacrylate or ethyl cellulose have been employed with success. The binder selected is dissolved in a solvent to assure that it will penetrate the mass of dielectric material. The nonlinear dielectric and electroluminescent particles mixed to produce the composite layer or mass of dielectric material may be oriented if required. These binders when retained in the electroluminescent and ferroelectric materials will not cause leakage or dissipation of stored fields to be described hereinafter.

Electrodes 12 and 13 are applied to opposite sides of the mass of dielectric material in any well known manner. These electrodes are employed for impressing charges on the dielectric materials and are cooperative in establishing and maintaining an electric field.

One method of preparing the structure is to mix thoroughly the following ingredients:

95 parts barium-strontium titanate ferroelectric ceramic (containing 68 mole percent barium titanate and 32 mole percent strontium titanate) ground to about 2$\mu$ particle size.

5 parts zinc sulfide, copper activated, electroluminescent phosphor, particle size 2$\mu$ or less.

50 parts polymethylmethacrylate (dissolved in toluene, q.s.)

The mixture is then applied to a glass support member having a conductive coating of a material such as tin oxide deposited thereon to form the electrode 13. The layer should be about .010 inch thick.

Figure 2:
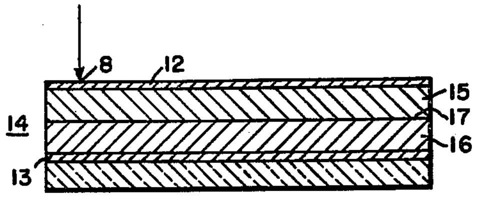
FIG. 2 is a view in elevation of a solid state screen which is a modification of the screen shown in FIG. 1.

A modification of the structure disclosed in FIG. 1 is shown in FIG. 2. In this embodiment of the invention, the disk or mass of dielectric material shown generally at 14 comprises two independent separately prepared layers 15 and 16, one of a nonlinear dielectric or ferroelectric material and the other of electroluminescent material. These layers 15 and 16 will each be prepared from powdered material compressed and bonded into a mass by a suitable binder. After the separate layers 15 and 16 have been prepared from selected materials and treated to give the members the required physical characteristics, they will be bonded to one another along the plane 17. Again the binders employed in making the layers 15 and 16 and in bonding the layers to one another are selected because of their specific electrical characteristics such as conductivity and permittivity. The composite layer or mass 14 will be about the same thickness as the composite layer in FIG. 1 that is about one-sixteenth of an inch. The ferroelectric and electroluminescent materials will be in intimate contact across the plane 17. Electrodes 12 and 13 will be applied to the composite disk 14 as shown in the structure illustrated in FIG. 1.

This structure may be prepared by using a sheet of barium strontium titanate ferroelectric ceramic (containing 68 mole percent barium titanate and 32 mole percent strontium titanate). The field responsive phosphor is then deposited on one surface of the ceramic sheet. There are many well-known methods of accomplishing this, and as a specific example, a finely-divided phosphor material, for example, zinc sulfide activated by copper, may be admixed with a solvent such as butyl acetate and with a polyvinyl chloride lacquer. The proportion of the constituents are not critical and may be varied within wide limits, but as a specific example, 3 parts by weight of phosphor may be mixed with 50 parts by weight of thinner and 35 parts by weight of polyvinyl chloride lacquer. The foregoing admixture may be sprayed in a plurality of coatings, for example 4, according to the desired thickness, drying between each coating. Other dielectrics and solvents may be substituted for the foregoing specific examples as is well known. Before the last coating dries or is cured, a glass plate having a conductive coating may be placed on the phosphor to form one electrode.

As is well known in the art, electroluminescent material depends for its illumination on high frequency fields. If an electroluminescent material, such as zinc sulfide, is subjected to a field of about 50 volts per mil, or more, at a frequency of the order of 20 to 10,000 cycles per second, it will become luminous. If the typical composite mass of FIG. 1 or 2 is subjected to an alternating field of 100 volts per mil, then about 100 volts per mil will be applied to the nonlinear dielectric or ferroelectric material and about 100 volts per mil will be applied to the electroluminescent material. The result is, that the electroluminescent material will be rendered luminous.

If a direct current charge, for example, one sufficient to produce an average field of the order of 150 volts per mil, is imposed on the composite layer or screen shown in either FIG. 1 or 2, at the same time that the alternating field is applied, the effective alternating current permittivity of the nonlinear dielectric material will be appreciably changed. The distribution of the alternating field in the screen is then changed because of the change in the permittivity of the nonlinear dielectric material. The field distribution for an average applied alternating field of 100 volts per mil now is 167 volts per mil applied to the nonlinear dielectric material and 33 volts per mil to the electroluminescent material. When the fields are thus modified, the electroluminescent material will no longer be luminous but dark. The direct current charge is in effect a control signal which can be utilized to regulate the luminosity of the electroluminescent materials at any value between bright and dark.

A nonlinear dielectric material of low conductivity is preferable since it cooperates with the electroluminescent material and electrodes to store a charge when subjected to a control potential. When a light power potential is impressed across the electrodes the luminosity of the electroluminescent material in the composite mass 14 depends on the field resulting from the control voltage applied and the effect of the field on the nonlinear material associated with the electroluminescent material in the composite mass of dielectric material. When a localized area of the composite mass or layer 14 is subjected to a control field it modifies the division of the light power potential and regulates the potential applied to the electroluminescent material in the localized area. Therefore each localized area or element will receive a light power potential which depends on or is regulated by the control charge or field. The brightness of the screen will accordingly vary with the distribution of the control potential or field. Consequently, when a control signal is supplied to the composite layer or screen a radiation image will appear corresponding to the charge distribution. The storage capacity of the screen is sufficient to maintain a radiation image until the next signal is received. In general the permittivity of the composite mass 14 is a function of the field produced by the applied control potential and the luminous condition of the localized electroluminescent material and the permittivity will change with the amplitude of the control potential.

When the mass of dielectric materials in the composite layers 9 and 14, is utilized in an ordinary display screen, it may be necessary through the cooperative action of the nonlinear dielectric and electroluminescent materials to maintain the field established by the charge delivered to the electrodes for a time of the order of minutes. However, if the composite layers of the mass of dielectric is being utilized as a television screen, it is common to receive the signals at a rate of about thirty impules per second. In such case, the field established by the cooperative action of the nonlinear dielectric and electroluminescent materials in response to the control charge will be maintained only for the interval between signals. It has been found by experience in television reception that when a composite layer or mass of this type is subjected to signal charges at the rate of about thirty to the second that there is substantially no flicker on the screen. In connection with this paragraph reference is made to copending application Serial No. 628,421, filed December 14, 1956, now U.S. Patent 2,917,667 issued December 15, 1959 and assigned to the same assignee as the present invention.

The electrodes 12 provided in the embodiments shown in FIGS. 1 and 2 are utilized for delivering a control signal to a screen comprising composite layer 9 or 14. The electrode is made of some suitable material having what is generally described as high impedance to the transverse flow of direct current and a low impedance to the transverse and normal flow of an alternating current. When the term transverse is employed, it means in the plane of the electrode. Normal in this paragraph means at right angles to the plane of the electrode. Therefore, the normal flow of current means through the electrode along a normal line.

A suitable electrode 12 can be fabricated as a layer from a material having a high permittivity and a low conductivity, for example, titanium dioxide or barium-strontium titanate ceramics. Barium titanates may be employed in many combinations known to anyone skilled in this art and when this term is employed herein it is intended to include any of the suitable known compounds.

When a high frequency alternating current voltage, hereinafter designated "light power potential," is applied across the electrodes 12 and 13, it will render the electroluminescent material 10 luminous. However, when a direct current control potential is applied to some point, for example 8, on the electrode 12 which is part of the screen, it will be localized because of the high transverse direct current impedance of the electrode and through the cooperative action of the nonlinear dielectric and electroluminescent materials a control field will be established only in the localized area. This field because of the nonlinear dielectric in the composite mass regulates the light power field in the electroluminescent material. Therefore the electrode 12 with high transverse impedance enables the building up of image patterns by applying direct current control charges through the electrodes 12 to different points or localized areas dispersed over the screen area. Further since the screen is made with no leaks through which the field may be dissipated the field may be maintained to meet design specifications.

The electrode 13 disposed opposite the electrode 12 may be made of some transparent metallic oxide. Tin oxide has been found to be quite satisfactory. In applying the electrode 13 it is preferable to deposit it on a layer of transparent glass 18 through which the image will be viewed and then apply the transparent glass layer carrying the tin oxide to the composite layer 9 or 14. The tin oxide electrode will be disposed next to the composite mass. The clear transparent glass 18 will serve as a support for the composite layer 9 or 14 and electrode 13.

In applying the light power potential, it will be impressed across the electrodes 12 and 13. The control potential will be applied to the electrode 12 in a predetermined pattern which will depend on the intelligence signal it is desired to apply and the image that it is required to establish. The control potential may be applied to the different contact points on the screen by some suitable mechanical or electronic switch or signal distribution mechanism. A cathode ray beam is a well known signal distribution means.

Figure 3:
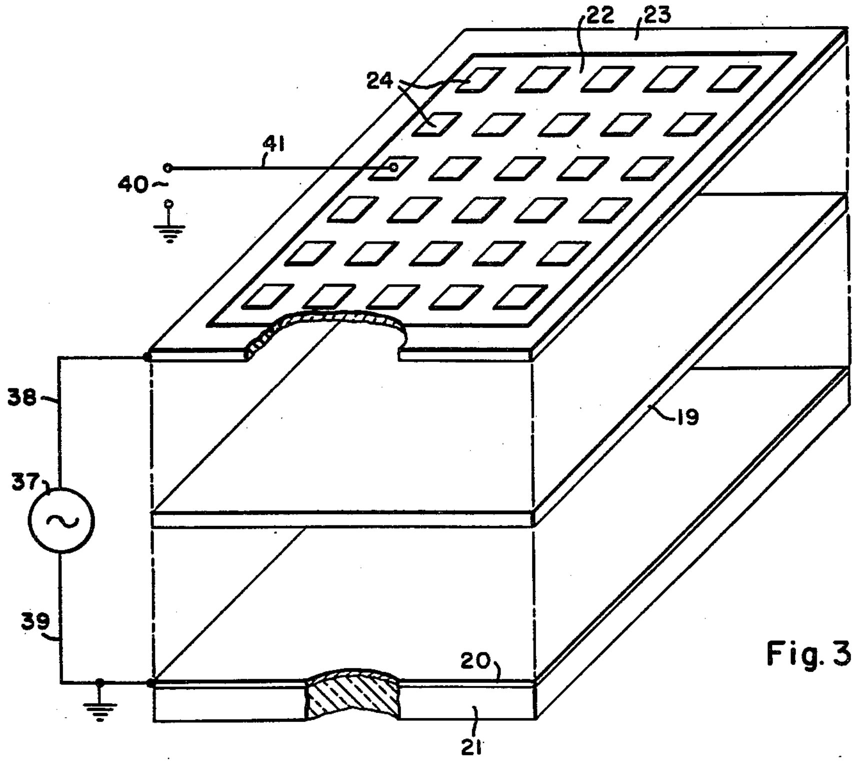
FIG. 3 is a view in perspective of an exploded solid state screen showing the features of the structure.

The modification of the invention illustrated in FIG. 3 is somewhat similar to the modifications of FIGS. 1 and 2. In this case, the composite layer 19 may be the same as either of the composite layers illustrated in FIGS. 1 and 2. The electrode 20 will be a layer of tin oxide deposited on the glass support 21 or equivalent. The electrode 22 may be made from barium-strontium titanate as described for the electrodes in modifications of FIGS. 1 and 2. In this case, a bus 23 is provided and electrically connected to the edges of the barium-strontium titanate electrode 22. In addition, a plurality of contact members 24 are provided on the barium-strontium titanate electrode 22.

In connecting the bus 23 and the contact members 24 to the electrode 22, the barium-strontium titanate will first be painted with a silver paint. This paint will then be fired. After the silver paint has been applied to the edges of the electrode 22, the copper bus 23 may be readily soldered in position. In the case of the silver contact members 24, they will serve without any further metal being deposited thereon for the impressing of the control charge on the screen.

When the bus 23 has been properly applied to the electrode 22, the alternating current light power potential will be applied across the bus 23 and the electrode 20. The manner in which the light power potential is applied is illustrated by connecting the alternating current power source 37 across the bus 23 and electrode 20 through the conductors 38 and 39, respectively. The direct current control potential may be applied to the contact members 24 by electrical conductors. In the drawing, the direct current power source 40 is shown connected through conductor 41 to only one of the electrodes 24. This facilitates the localizing of the applied control charge since the electrode 22 has high impedance transversely to the direct current charge applied. The direct current charge will be restricted to substantially the area of the electrodes 24. The signal charges may be distributed in the manner described for the screens of FIGS. 1 and 2.

Figure 4:
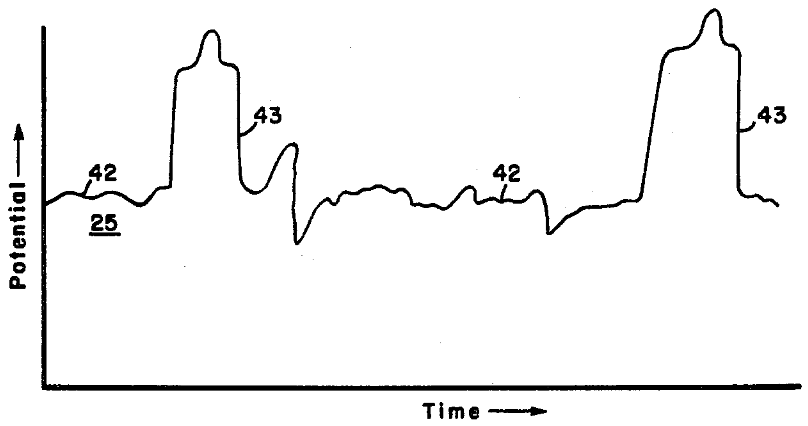
FIG. 4 is a curve showing a typical video wave form which may be transmitted to the solid state screen for producing an image.

The curve shown generally at 25 of FIG. 4 is typical of a video signal and in operation will be broken into discrete intervals and distributed to the various contact members 24 on the electrode 22. It comprises video information as at 42 and synchronizing pulses 43. A distribution system for the video information such as disclosed in application Serial No. 628,420, filed December 14, 1956, now Patent 2,888,593, issued May 26, 1959, may be employed.

Figure 5:
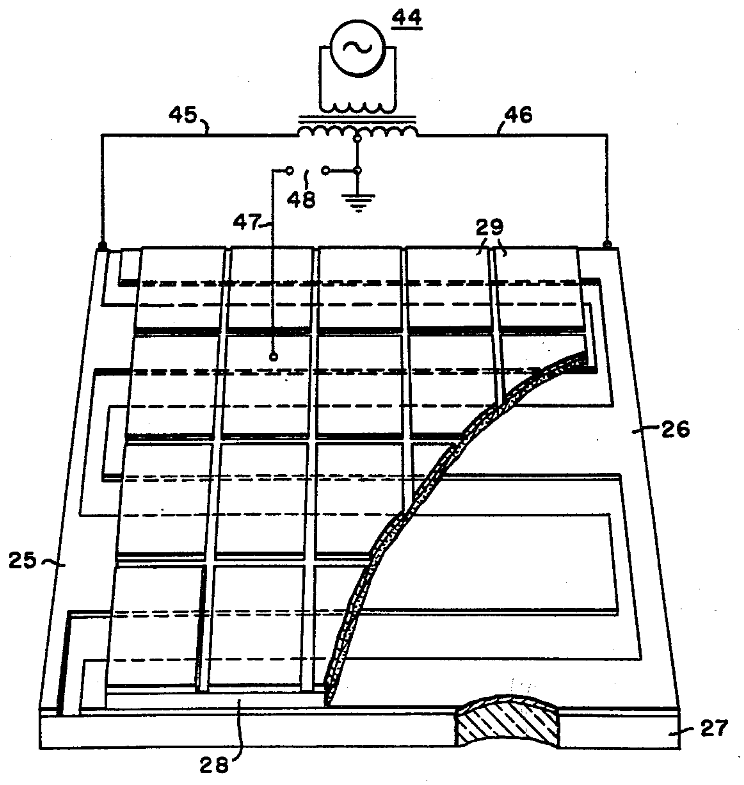
FIG. 5 is a view in perspective of a solid state screen constructed in accordance with the teachings of this invention.

Another embodiment of the invention is illustrated in FIG. 5. In this instance, instead of a tin oxide electrode appearing as a sheet, it is made in the form of comb-shaped members 25 and 26. These comb-shaped members are disposed in intermeshing relationship on the transparent glass support 27. The composite layer 28 of dielectric material is superimposed on the tin oxide electrodes 25 and 26. The composite layer 28 may be either of the modifications shown in FIGS. 1 and 2 and described hereinbefore.

On top of the composite layer 28 there are a plurality of electrodes 29 which are evaporated silver or aluminum. These electrodes may be readily evaporated on the composite layer in any well known manner such, for example, as disclosed in Patent 2,724,663.

In operation the alternating current light power potential will be connected across the electrodes 25 and 26. This is illustrated by connecting the alternating current power source shown generally at 44 to the electrodes 25 and 26 through conductors 45 and 46, respectively. The direct current control potential or video information will be applied to electrodes 29, through conductor 47 from power source 48 in accordance with any of the well-known practices as by a cathode ray beam referred to hereinbefore.

Figure 6:
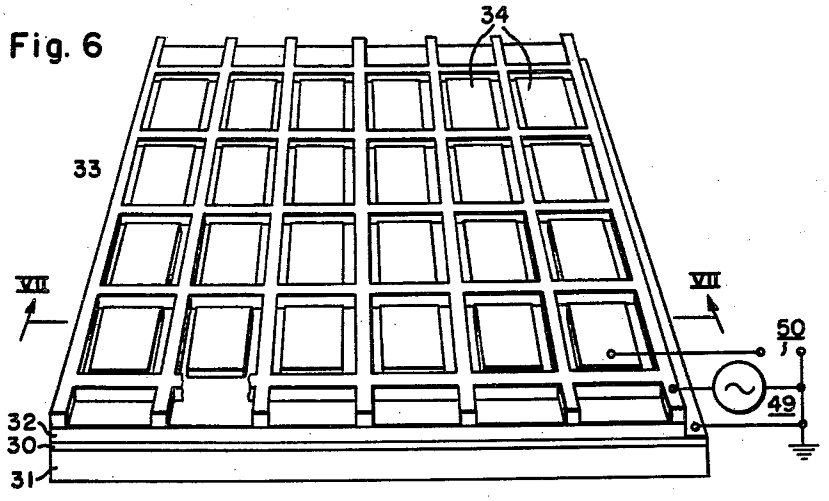
FIG. 6 is a view in perspective of a modified solid state screen showing features of the invention.

In the modification of the invention illustrated in FIG. 6, the electrode 30 will be tin oxide deposited on a supporting sheet of glass 31. A composite layer 32 such as shown in FIGS. 1 and 2 and described hereinbefore is superimposed on the tin oxide layer 30. An electrode 33, simulating a wire mesh with rectangular openings is mounted on the composite layer 32. The mesh electrode 33 will be made of a conducting metal such as copper or aluminum. The size of the squares between the conductors of the mesh 33 will depend on the conditions to be met. After the mesh has been applied, contact members 34 of copper or some other suitable conducting material, will be applied by any well-known evaporation process one of which has been referred to hereinbefore.

In this modification of the invention, the alternating current light power potential will be impressed across the electrodes 33 and 30 from a power source shown generally at 49. The direct current control potential will be impressed on the contact members 34. The source of the control potential or video information is illustrated generally at 50. Any suitable means well known in the art may be employed for applying the control potential from the source 50.

Figure 7:
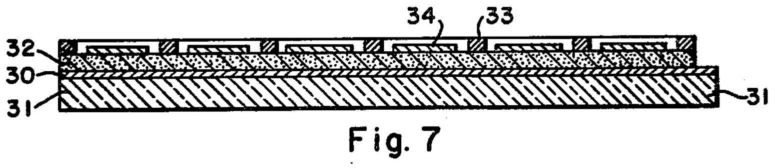
FIG. 7 is a view, in section, taken along the line VII—VII of FIG. 6.

In the cross section of the solid state screen illustrated in FIG. 7 the control electrodes 34 are shown spaced from the mesh electrode 33. The spacing should be adequate to prevent the control signal from readily flowing from electrodes 34 to electrode 33.

The glass sheet 31 will be made of some suitable thickness to facilitate the proper displaying of the image created on the screen. Glass suitable for this purpose is well known in the art and need not be described in detail.

The display screen disclosed herein can be mounted in cathode ray tubes as shown and described in copending application Serial No. 628,420, filed December 14, 1956, now Patent No. 2,888,593, issued May 26, 1959.

It has been found that a charge can be delivered to the composite mass or screen through a conductive layer. In the modification shown in FIG. 8 the composite mass or screen 64 has a layer of aluminum 65 evaporated onto one side. A layer of aluminum is suggested since it is conductive but other equivalent materials may be employed. On the other side of the composite mass a layer or electrode 66 of tin oxide which is transparent is applied. In this manner the composite mass 64 is sandwiched between two electrodes 65 and 66. An alternating current power source shown generally at 67 is electrically connected through conductors 68 and 69 to the electrodes 65 and 66, respectively. The light power potential will be delivered to the composite mass 64 from the power source 67.

As has been described hereinbefore, when tin oxide is to be applied, it is first deposited on a layer of glass 70. After the tin oxide has been deposited on the glass 70, the electrode 66 is bonded to the composite mass 64.

The composite mass or screen 64 will be similar to that described in the other modifications. It may be either powdered electroluminescent and nonlinear dielectric materials intimately mixed and held together by a binder or layers of electroluminescent and nonlinear dielectric materials bonded along their meeting surfaces.

Figure 8:
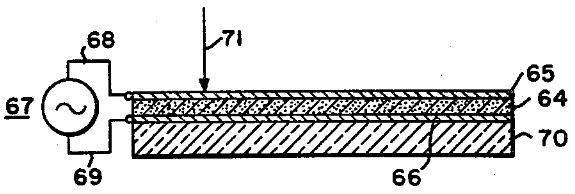
FIG. 8 is a view in elevation of a screen the elements of which are somewhat exaggerated in size for purposes of illustration.

The screen illustrated in FIG. 8 may be utilized in a cathode ray tube. The electron beam represented by the line 71 will penetrate the layer of conducting material 65 and deposit a charge in the composite layer 64.

Since certain changes may be made in the above construction and different embodiments of the invention could be made without departing from the scope thereof, it is intended that all matter contained in the above description or shown in the accompanying drawings shall be interpreted as illustrative and not in a limiting sense.

We claim as our invention:

1. In a solid state display screen, in combination, a dielectric mass comprising electroluminescent material capable of illumination when subjected to an alternating current light power potential, nonlinear dielectric material responsive to a direct current control charge, the dielectric mass being consolidated from the electroluminescent and nonlinear dielectric materials intimately mixed in powdered form, a plurality of control electrodes applied to one side of the dielectric mass, the plurality of electrodes being disposed in spaced relationship, a transparent conductive electrode applied to the opposite side of the dielectric mass, a light power source for applying an alternating current light power potential across the electrodes applied to the opposite sides of the dielectric mass, and a current control source for imposing a direct current control potential to the plurality of electrodes disposed on one side of the dielectric mass, the direct current control potential being applied to the spaced electrodes in any predetermined order, the nonlinear dielectric and the electroluminescent materials cooperating with the spaced electrodes on one side of the dielectric mass to establish a field for controlling the luminosity of the electroluminescent material in response to the applied light power potential.

2. In a solid state display screen, in combination, a dielectric mass comprising electroluminescent material and nonlinear dielectric material consolidated into separate layers intimately bonded, a plurality of metallic electrodes applied to one side of the dielectric mass, a transparent metallic oxide electrode applied to the other side of the dielectric mass, a light power source for applying an alternating current light power potential across electrodes disposed on opposite sides of the dielectric mass, and a direct current control source for applying a direct current control potential to the metallic electrodes applied to one side of the dielectric mass, the electroluminescent and nonlinear dielectric materials cooperating to establish a field around the metallic electrodes receiving the control charge to regulate the luminosity of the electroluminescent materials subjected to a light power potential.

3. In a solid state display screen, in combination, a composite mass consolidated from electroluminescent and nonlinear dielectric materials intimately mixed in powdered form, a first plurality of electrodes applied to one side of the composite mass of dielectric materials, a transparent glass, a second plurality of electrodes disposed on the transparent glass, the second plurality of electrodes presenting intermeshing arms disposed in spaced relationship, the glass support carrying the second plurality of electrodes being disposed on the opposite side of the composite layer from the side carrying the first plurality of electrodes, the electrodes carried by the glass being in contact with said composite layer, a light power source for applying an alternating current light power potential across the second plurality of electrodes and the electrodes carried by the glass, and a direct current control source for applying direct current control potentials to the first plurality of electrodes disposed on one side of the composite dielectric mass, the electroluminescent and nonlinear dielectric materials cooperating to establish a field in conjunction with the electrode receiving a control charge to control the luminosity of the electroluminescent materials.

4. In a solid state display screen, in combination, a composite mass of dielectric materials comprising a layer of electroluminescent material and a layer of nonlinear dielectric material disposed in intimate contact with one another, a glass support, a plurality of electrodes of tin oxide applied to the glass support and disposed in spaced relationship, the tin oxide electrodes being applied to one side of the composite mass of dielectric material, a plurality of control electrodes applied to the other side of the composite mass of dielectric material, means for applying an alternating current light power potential to the plurality of electrodes of tin oxide, means for applying a direct current control potential to the plurality of electrodes on the said opposite side of the composite mass, the nonlinear dielectric and electroluminescent materials cooperating with the plurality of electrodes to establish a field to control the brightness of the electroluminescent material in response to the applied control charge.

5. In a solid state display screen, in combination, a composite mass comprising a layer of electroluminescent material and a layer of ferroelectric material, an electrode comprising a metallic oxide transparent film applied to the exposed side of the electroluminescent layer, a transparent glass support applied to the transparent metallic oxide film, a conductive mesh applied to the exposed side of the ferroelectric layer serving as an electrode, means for applying an alternating current light power potential across the mesh and the metallic oxide film applied as an electrode to energize the electroluminescent material, a plurality of metallic electrodes disposed in the areas between the mesh, and means for applying a control potential to the electrodes disposed in the spaces in the mesh to cooperate with the electroluminescent and ferroelectric materials to establish fields to control the radiation images produced.

6. In a solid state display screen, in combination, a dielectric mass comprising electroluminescent material capable of illumination when subjected to an alternating light power potential and ferroelectric material capable of storing a direct current charge, the dielectric mass being consolidated from electroluminescent and ferroelectric materials, an electrode having a low impedance to alternating current and a high transverse impedance to a direct current charge applied to one side of the dielectric mass, another electrode comprising a transparent metallic oxide film and a transparent glass to which the metallic oxide film is applied disposed on the opposite side of the dielectric mass, means for imposing an alternating current light power potential across the electrodes, and means for impressing a spatially distributed direct current control charge on the electrode having the high transverse impedance to direct current, the control charge thereby being localized and effecting a charging of the ferroelectric and electroluminescent materials in said localized area, the ferroelectric and electroluminescent materials cooperating to establish a field to control the localized brightness of the electroluminescent material.

7. A solid state display screen, comprising, in combination, a dielectric mass consisting of electroluminescent material capable of illumination when subjected to an alternating current potential and ferroelectric material capable of storing a charge when subjected to a direct current signal, the dielectric mass being consolidated from electroluminescent and ferroelectric materials, an electrode comprising a layer of barium titanate ceramic, the layer of barium titanate ceramic having a low through impedance to alternating current and a high transverse impedance to a direct current charge applied to one side of the dielectric mass, a conducting member electrically connected to the layer of barium titanate, another electrode comprising a film of transparent metallic oxide material, a glass support for the film of metallic oxide material, the said another electrode being applied to the opposite side of the dielectric mass from the barium titanate ceramic electrode, means for applying an alternating current light power potential across the electrodes to render the electroluminescent material luminous, means for applying a direct current control potential to the electrode of barium titanate ceramic to impose a charge on the dielectric materials in a localized area, said ferroelectric and electroluminescent materials cooperating to establish a field capable of holding a charge and of effecting the control of the illumination of the electroluminescent material in the localized area.

8. In a solid state display screen, in combination, a composite mass of electroluminescent and ferroelectric materials, the ferroelectric and electroluminescent materials being associated in intimate relationship, a first conducting electrode means applied to one side of the composite mass, a second conducting electrode means applied to the other side of the composite mass, a power potential source for applying an alternating current light power potential to the first conducting electrode means to establish a field on the composite mass and a control charge source for delivering a control charge through the second conducting electrode means to the composite mass to control the magnitude of the field appearing across said electroluminescent material in said composite mass.

References Cited in the file of this patent

UNITED STATES PATENTS

| | | |
|---|---|---|
| 2,566,349 | Mager | Sept. 4, 1951 |
| 2,792,447 | Kazan | May 14, 1957 |
| 2,813,223 | Kalfaian | Nov. 12, 1957 |
| 2,873,380 | Kazan | Feb. 10, 1959 |
| 2,877,371 | Orthuber et al. | Mar. 10, 1959 |
| 2,894,854 | MacIntyre et al. | July 14, 1959 |

FOREIGN PATENTS

| | | |
|---|---|---|
| 204,854 | Australia | May 26, 1955 |